United States Patent Office 2,976,292
Patented Mar. 21, 1961

2,976,292 p-NITROSOANILINO BENZOTHIAZOLES

Ching C. Tung, Kirkwood, Mo., and John J. D'Amico, Charleston, W. Va., assignors to Monsanto Chemical Company, St. Louis, Mo., a corporation of Delaware No Drawing. Filed Nov. 28, 1958, Ser. No. 776,766

5 Claims. (Cl. 260—305)

The present invention relates to a new class of compounds. More particularly, the invention relates to p-nitrosanilino benzothiazoles of the general formula

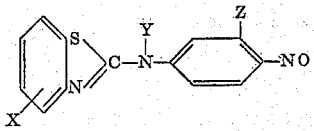

where X represents hydrogen, halogen, alkyl, alkoxy, nitro or phenyl and Y represents hydrogen, alkyl or nitroso. Examples of alkyl radicals include methyl, ethyl, n-propyl, isopropyl, n-butyl, tert-butyl and n-amyl. Examples of alkoxy radicals include methoxy, ethoxy, n-propoxy, isopropoxy and n-butoxy. The nitroso phenyl radical may contain substituents in the meta but not the ortho position, particularly lower alkyl, lower alkoxy or halogen. Thus, Z represents lower alkyl, lower alkoxy, halogen or hydrogen.

The new compounds are readily prepared by the condensation of a 2-halogen arylene thiazole with aniline or N-substituted secondary aniline having a reactive hydrogen and treating the product with cold nitrous acid. The required intermediates have been described but lack significant biological activity whereas the new compounds find application for the destruction of undesired vegetation, and microorganisms. Examples of the new compounds comprise 6-ethoxy-2-(N-methyl-p-nitrosoanilino)benzothiazole,
4-phenyl-2-(N-methyl-p-nitrosoanilino)benzothiazole,
5-nitro-2-(N-methyl-p-nitrosoanilino)benzothiazole,
4-methyl-2-(N-methyl-p-nitrosoanilino)benzothiazole,
2-(p-nitrosoanilino)benzothiazole,
2-(N-methyl-p-nitrosoanilino)benzothiazole,
5-chloro-2-(N-methyl-p-nitrosoanilino)benzothiazole,
5-chloro-2-(N-ethyl-p-nitrosoanilino)benzothiazole,
2-(N-ethyl-p-nitrosoanilino)benzothiazole,
2-(N-methyl-3-methyl-4-nitrosoanilino)benzothiazole,
2-(N-methyl-3-chloro-4-nitrosoanilino)benzothiazole,
2-(N,4-dinitrosoanilino)benothiazole,
2-(N - methyl - 3 - methoxy - 4 - nitrosoanilino)benzothiazole, and
5-bromo-2-(N-methyl-p-nitrosoanilino)benzothiazole.

The preparation is illustrated by the following detailed examples:

Example 1

To 214.3 grams (2.0 moles) of N-methyl aniline at 80° C. was added dropwise at 80–100° C. during 15 minutes 169.63 grams (1.0 mole) of 2-chlorobenzothiazole. The stirred reaction mixture was heated at 140–150° C. for 6 hours. After cooling to 90° C., 500 ml. of water was added and stirring continued for 30 minutes. The top aqueous layer was decanted and the bottom organic layer dissolved in 500 ml. of chloroform. The chloroform solution was washed with 300 ml. of water and the bottom layer which separated was distilled at atmospheric pressure to remove the chloroform. The excess or unreacted N-methyl aniline was removed by distillation at 3 mm. at a maximum pot temperature of 225° C. The 2-(N-mehtylanilino)benzothiazole so obtained was a viscous oil which solidified on standing. To 40 grams (0.166 mole) of this thiazole was added with stirring 250 ml. of ethyl alcohol, 68 ml. of concentrated hydrochloric acid and 250 grams of ice. To this cold solution was added dropwise at 0–5° C. in 10 minutes 12 grams (0.168 mole) of 97% sodium nitrite dissolved in 20 ml. of water. The mixture was stirred at 0–10° C. for one hour, then 25% sodium hydroxide added dropwise at 10–20° C. until a pH of 8 was obtained. Stirring was continued for another hour at 10–20° C. and the resulting precipitate filtered, washed with water until free of chloride and air dried at room temperature. The 2-(N-methyl-p-nitrosoanilo)benzothiazole was a green solid melting at 70–72° C. after recrystallization from ethyl alcohol. Analysis gave 11.6% sulfur as compared to 11.9% calculated for $C_{14}H_{11}N_3OS$.

Example 2

2,5-dichlorobenzothiazole was substituted for 2-chlorobenzothiazole in the procedure of Example 1. The charge of 2,5-dichlorobenzothiazole was 102.04 grams (0.5 mole), yielding 5-chloro-2-(N-methylanilino)benzothiazole. To a reactor was charged 68.7 grams (0.25 mole) of the 5-chloro-2-(N-methylanilino)benzothiazole so obtained, 250 ml. of ethyl alcohol, 250 grams of ice, 18.5 grams (0.26 mole) of 97% sodium nitrite dissolved in 30 ml. of water and enough 25% sodium hydroxide to give a pH of 8. The 5-chloro-2-(N-methyl-p-nitrosoanilino)benzothiazole isolated by the procedure of Example 1 was a green solid and was obtained in 96% theory yield. After recrystallization from ethyl alcohol it melted at 68–70° C. Analysis gave 10.8% sulfur and 12.1% chlorine as compared to 10.6% sulfur and 11.7% chlorine calculated for $C_{14}H_{10}ClN_3OS$.

Example 3

To a stirred solution comprising 72.2 grams (0.25 mole) of 5-chloro-2-(N-ethylanilino)benzothiazole, 200 ml. of acetic acid and 105 ml. of concentrated hydrochloric acid was added 100 grams of ice followed by the addition dropwise of 18.5 grams (0.26 mole) of 97% sodium nitrite dissolved in 30 ml. of water. During the addition, which required 10 minutes, the temperature was held at 0–10° C. Stirring was continued at this temperature for an additional hour and then 25% sodium hydroxide was added dropwise at 0–15° C. until a pH of 8 was obtained. After stirring for an hour at 0–10° C. the precipitate was collected by filtration, washed with one liter of water and air dried at 25–30° C. The 5-chloro-2-(N-ethyl-p-nitrosoanilino)benzothiazole was obtained as a dark brown solid in 97.5% yield. After recrystallization from ethyl alcohol it melted at 44–46° C. Analysis gave 10.7% sulfur as compared to 10.1% calculated for $C_{15}H_{12}ClN_3OS$.

The p-nitrosoanilino benzothiazoles as disclosed herein are of utility in many important applications. Applied as a foilage spray containing 0.5% of the active ingredient 2-(N-methyl-p-nitrosoanilino)benzothiazole was severely toxic to broadleaf plants and some grasses, especially crabgrass. In pre-emergence application at 10 pounds per acre the same compound was severely toxic to wild oats and pigweed. In lower concentrations the compounds are useful for combating plant diseases and microorganisms. For example, 5-chloro-2-(N-methyl-p-nitrosoanilino)benzothiazole controlled fusarium wilt of tomatoes at 0.01% concentration and was fairly effective at 0.001%. 2-(N-methyl-p-nitrosoanilino)benzothiazole is an active wheat rust eradicant at concentrations of 0.1–0.25%. Furthermore, the latter gave 100% kill of the yellow fever mosquito larvae at 0.001%. However, substitution in the thiazole ring rendered the compound slightly less active against this organism. Toxicity to microorganisms is illustrated by the fact that at a concentration of 0.001% 2-(N-methyl-p-nitrosoanilino)benzothiazole prevented growth of *Staphylococcus aureus*.

It is intended to cover all changes and modifications of the examples of the invention herein chosen for purposes of disclosure which doe not constitute departures from the spirit and scope of the invention.

What is claimed is:

1. A compound of the structure

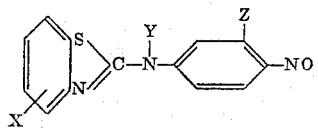

where X is selected from the group consisting of hydrogen, halogen, lower alkyl, lower alkoxy, nitro and phenyl, Y is selected from the group consisting of hydrogen, lower alkyl and nitroso and Z is selected from the group consisting of lower alkyl, lower alkoxy, halogen and hydrogen.

2. A compound of the structure

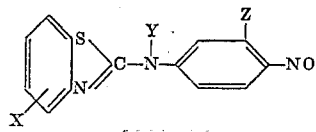

where X and Z are hydrogen and Y is lower alkyl.

3. A compound of the structure

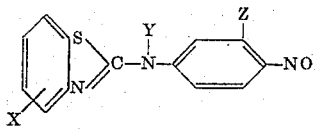

where X is halogen, Y is lower alkyl and Z is hydrogen.

4. A compound of the structure

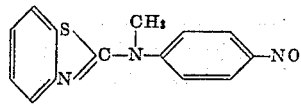

5. A compound of the structure

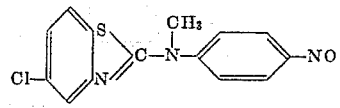

No references cited.